United States Patent [19]

Fukuba

[11] 4,117,969
[45] Oct. 3, 1978

[54] METHOD FOR INTERCONNECTING ADJACENT ELECTRIC STORAGE BATTERIES

[75] Inventor: Kiyohide Fukuba, Uji, Japan

[73] Assignee: Japan Storage Battery Company Limited, Kyoto, Japan

[21] Appl. No.: 734,051

[22] Filed: Oct. 20, 1976

[30] Foreign Application Priority Data

Oct. 22, 1975 [JP] Japan .................... 50-127795
Oct. 22, 1975 [JP] Japan .................... 50-127796

[51] Int. Cl.² .................... H01M 2/26; H01M 2/32; B23K 3/06
[52] U.S. Cl. .................... 228/140; 228/56; 228/179; 228/251; 228/901; 29/628
[58] Field of Search .................... 228/58, 56, 140, 179, 228/251, 252, 901; 29/628; 429/121, 158–160

[56] References Cited

U.S. PATENT DOCUMENTS

| 678,443 | 7/1901 | Still | 429/186 |
|---|---|---|---|
| 1,659,463 | 2/1928 | Entz | 429/160 X |
| 1,823,028 | 9/1931 | Caldwell | 228/56 X |
| 2,512,426 | 6/1950 | Hartley | 228/140 |

FOREIGN PATENT DOCUMENTS 2,032,939  7/1970  Fed. Rep. of Germany .......... 228/179

OTHER PUBLICATIONS

"Technical Bulletin No. FA-64", Semi-Alloys, Mount Vernon, N.Y.

Primary Examiner—James L. Jones, Jr.
Assistant Examiner—K. J. Ramsey
Attorney, Agent, or Firm—Sughrue, Rothwell, Mion, Zinn and Macpeak

[57] ABSTRACT

A method for interconnecting adjacent batteries applicable to the combination of a plurality of batteries into a single battery system. An alloy having a melting point in a range of from 40° C to 180° C and formed into a foil is inserted between the terminals to be connected together, or between a terminal and a conductor to be connected together, and the alloy is then heated to a temperature higher than its melting point.

8 Claims, 12 Drawing Figures

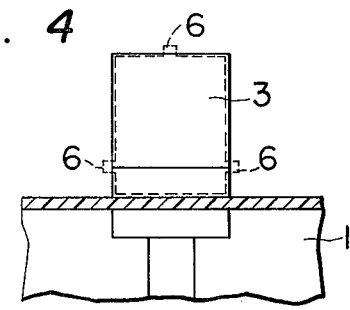
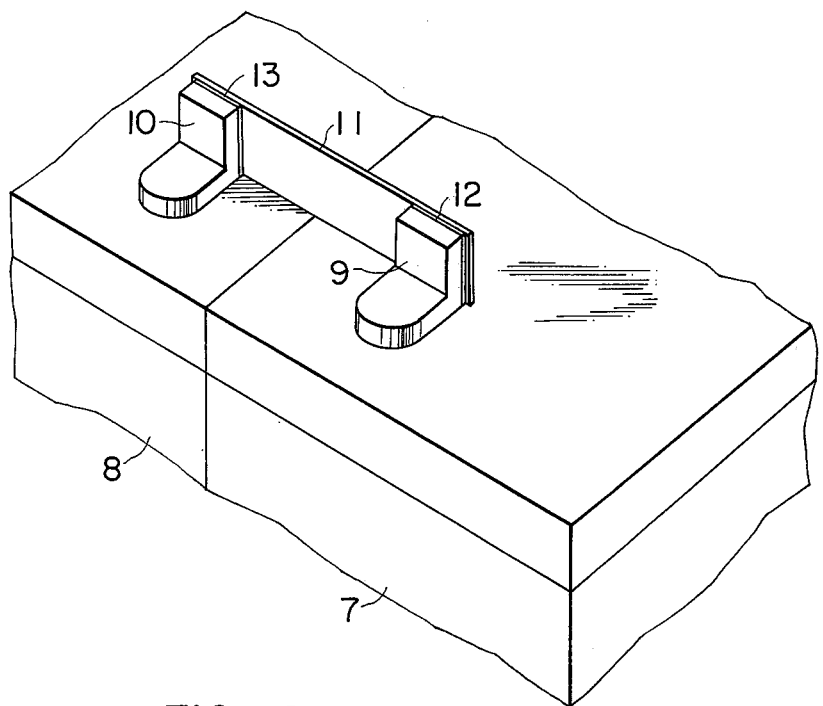
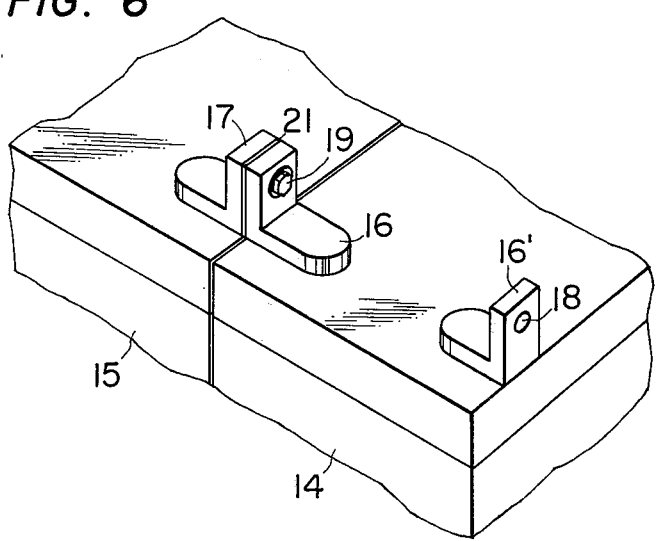

METHOD FOR INTERCONNECTING ADJACENT ELECTRIC STORAGE BATTERIES

BACKGROUND OF THE INVENTION

1. Field of the Invention

This invention relates to a method for interconnecting adjacent electrical storage batteries into a single battery system using a fusible alloy.

2. Description of the Prior Art

Heretofore, in connecting adjacent batteries in a battery system a method of clamp-connecting a conductor such as a copper plate or a copper wire to the terminals of the batteries by the use of bolts and nuts has been used most frequently. However, such connections suffer from the shortcomings of acid mist or alkali mist generated during the charging of the batteries being deposited on the upper surfaces of the batteries, the mist tending to filtrate into the gap between the terminal and the connecting conductor thereby corroding the contacting surfaces of the terminal and the conductor. Furthermore, since the terminal and the connecting conductor are simply clamped together by means of the bolts and nuts, the contacting surfaces of the terminal and the conductor tend to deteriorate, thereby increasing the contact resistance and the voltage drop thereacross. Furthermore, such increase in the contact resistance and the voltage drop tends to reduce the discharge capacities of the batteries and/or generates heat at the contact parts, thus giving rise to further degradation in the operation of the batteries.

To eliminate the above described drawbacks of the clamp-type connecting method, a soldering alloy (Pb-Sb alloy) procedure has been used for connecting the terminals of the batteries and the conductors. However, this procedure utilizes a soldering alloy having a melting temperature higher than 220° C. Recently, synthetic resin covers have been widely used for batteries, and there has been a tendency for the heat from the soldering alloy to melt a part of the synthetic resin cover. This in turn tends to deteriorate the air seal where the terminal penetrates the cover, allowing the acid mist or alkali mist created during the charging of the battery to escape through the gap created between the terminal and the cover and condense on the upper surface of the battery, thus creating a leakage current path between the anode and cathode of the battery.

A procedure has also been proposed wherein the heat generated at the time of making the soldering connection is prevented from being conducted to the cover of the battery. However, this procedure is also unsatisfactory because it requires a special jig and the connecting operation is rather complicated.

SUMMARY OF THE INVENTION

According to the present invention the drawbacks and disadvantages of the prior art are overcome by inserting a low-melting point alloy having a melting point in a range of from 40° to 180° C. in the form of a foil, a sheet having slots, or a sheet in the form of a grating, between the terminals of adjacent batteries, or between the terminals and connecting conductors of adjacent batteries, and by then heat-melting the low-melting point alloy. If required, the terminals, or a terminal and a connecting conductor, may also be clamped together by bolts and nuts.

BRIEF DESCRIPTION OF THE DRAWINGS

FIG. 4 is a cross-sectional view showing the state before adjacent batteries are connected together in accordance with the present invention;

FIG. 5 is a perspective view showing another example of adjacent batteries connected together in accordance with this invention;

FIG. 6 is a perspective view showing another embodiment of the present invention;

DETAILED DESCRIPTION OF THE PREFERRED EMBODIMENTS

Figure 1:
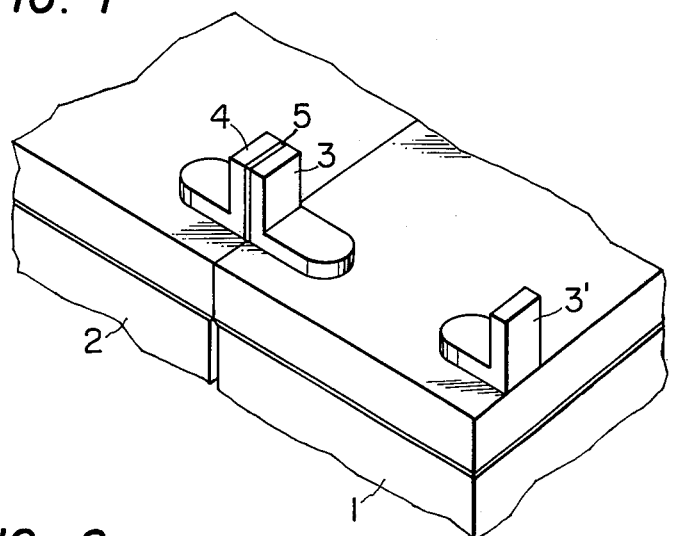
FIG. 1 shows a perspective view of a portion of a battery system wherein adjacent batteries are connected together by an embodiment of this invention.
Figure 2:
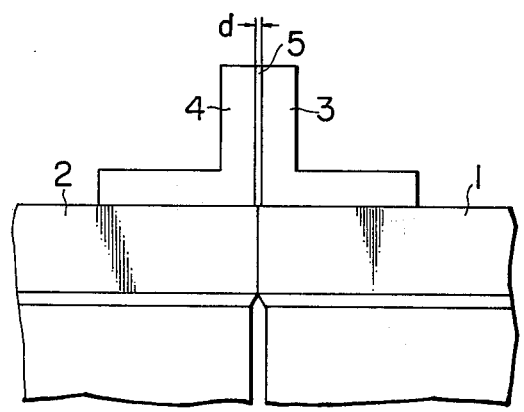
FIG. 2 is a front view of the connection shown in FIG. 1.

In FIGS. 1 and 2 reference numerals 1 and 2 designate electrical storage batteries such as lead storage batteries, alkali storage batteries, or the like. Reference numerals 3, 3' designate terminals of battery 1 and reference numeral 4 designates a terminal of battery 2. The terminals 3, 3', and 4 may be made of lead, lead alloy, or copper, or any of these materials plated with lead or tin. Reference numeral 5 designates an anti-corrosive low-melting point alloy of, for instance, Pb-Sn-Bi three element eutectic alloy or Pb-Sn-Bi-Cd four element eutectic alloy used for the melt-connection of terminal 3 of battery 1 and terminal 4 of battery 2. The melting point of the low-melting point alloy should be in a range of from 40° to 180° C. When an alloy having a melting point lower than 40° C. is used, the alloy will be in the molten state at a high room temperature or when the temperature of the terminal is slightly elevated by a heavy current flowing therethrough, thus resulting in an unsatisfactory or unstable terminal connection. On the other hand, if the melting point of the alloy exceeds 180° C., the shortcomings of utilizing the prior art soldering alloy (Pb-Sb alloy) will result.

Typical low-melting point alloys, and the compositions and melting points thereof, are shown in Table 1 below.

Table 1

| Sample | Composition (%) | | | | | Melting point (° C) |
|---|---|---|---|---|---|---|
| | Bi | Pb | Sn | Cd | others | |
| # 1 | | 82.5 | | 17.5 | | 248 |
| # 2 | | | 96.5 | | 3.5 Ag | 221 |
| # 3 | | | 91.0 | | 9.0 Zn | 199 |
| # 4 | | 38.14 | 61.86 | | | 183 |
| # 5 | | | 67.75 | 32.25 | | 176 |
| # 6 | 60.0 | | | 40.0 | | 144 |
| # 7 | | 30.6 | 51.2 | 18.2 | | 143 |
| # 8 | 57.0 | | 43.0 | | | 138.5 |
| # 9 | 56.0 | | 40.0 | | 4.0 Zn | 130 |
| #10 | 55.5 | 44.5 | | | | 124 |
| #11 | 53.9 | | 25.9 | 20.2 | | 102.5 |
| #12 | 52 | 32 | 16 | | | 95 |
| #13 | 51.65 | 40.20 | | 8.15 | | 91.5 |
| #14 | 57.5 | | 17.3 | | 25.2 In | 78.8 |
| #15 | 50.0 | 26.7 | 13.3 | 10.0 | | 70.0 |
| #16 | 49.40 | 18.00 | 11.60 | | 21.0 In | 58.0 |

Table 1-continued

| Sample | Composition (%) | | | | | Melting point (° C) |
|---|---|---|---|---|---|---|
| | Bi | Pb | Sn | Cd | others | |
| #17 | 44.70 | 22.60 | 8.30 | 5.30 | 19.10 In | 46.7 |

Figure 3A:
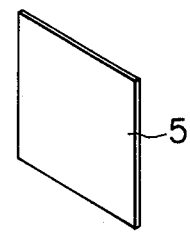
FIGS. 3A, 3B, 3C, and 3D are perspective views showing examples of low-melting point alloy configurations used in this invention.

FIG. 3A shows the original form of the alloy 5 in FIG. 1, wherein the alloy 5 is in the form of a foil. In practice, a low-melting point alloy formed into a foil 5 is inserted between the terminal 3 of battery 1 and the terminal 4 of battery 2, and while the two terminals are suitably compressed against each other the alloy 5 is heated into the molten state. More specifically, the connection is carried out in the following manner:

(1) The connecting surfaces of the terminals are ground by sand paper, brush, or the like until they become shiny, (2) A thin layer of acid-free paste is applied on the connecting surfaces of the terminals, (3) A low-melting point alloy in the form of a foil is inserted between the connecting surfaces, (4) A compressive force is applied across the terminals, (5) The low-melting point alloy is heated by applying en electric iron from the outer surfaces of the terminals until the alloy is completely melted, and (6) The entire assembly of the terminals is cooled naturally or water cooled until the molten alloy becomes solidified.

By thus inserting the low-melting point alloy between the terminals 3 and 4 and heating the alloy until it is melted, the molten alloy is extended over the entire connecting surfaces of the terminals 3 and 4 and held in this state after the alloy is cooled and solidified. Thus, the terminals 3 and 4 are completely fuse-connected through the alloy. In this method, since the fusion of the alloy is effected after the foil is inserted between the terminals 3 and 4, the alloy can diffuse over and throughout the entire connecting surfaces of the terminals, and a good connection is assured. Thus, there is no fear of the connecting surfaces of the terminals being exposed to the outer atmosphere and oxidized, or of the connecting surfaces becoming corroded by contact with the acid mist or alkali mist infiltrating between the connecting surfaces of the terminals. In comparison with this, if, for example, the pre-melted alloy is poured between the connecting surfaces of the terminals as in conventional methods, there is ample possibility, due to uneven heat absorption, of only the upper part of the terminals being connected together, or of uneven intrusion of the molten alloy between the connecting surfaces of the terminals, thus resulting in an incomplete and unreliable connection.

In the connecting method of this invention the distance $d$ between the connecting surfaces of the terminals 3 and 4, as shown in FIG. 2, has a major effect on the quality of the connection obtained. An excessively small distance $d$ causes uneven diffusion of the molten alloy along the connecting surfaces of the terminals, resulting in an insufficient and unreliable connection. On the other hand, an excessively large distance $d$ requires a longer heating period, thus making the connecting work troublesome and tending to cause the molten alloy to flow out of the connecting surfaces downwardly and damage the battery cover. Furthermore, an evenly distributed alloy diffusion does not result, and the mechanical strength of the connection is reduced. As a result of experiments, it has been found that a distance $d$ in a range of from 0.02 to 0.5 mm produces good electrical and mechanical characteristics in a connection between adjacent batteries. That is, when the interval $d$ is selected in the range of from 0.02 to 0.5 mm, superior capillary and diffusion phenomena result, and with the use of a suitable quantity of alloy a short heat-fusing period, good workability, no alloy flowing out or running, and great mechanical strength can be obtained.

Figure 3B:
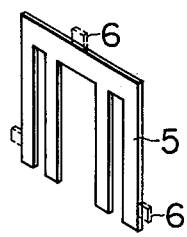
Figure 3C:
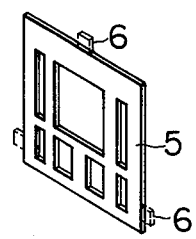

Although in the connecting method according to this invention it is desirable that the connection be carried out with an appropriate amount of the alloy, that is with a quantity equalling the product of the connecting surface area and the connecting interval, the foil-shaped alloy shown in FIG. 3A is sometimes disadvantageous in that it is made thin enough to provide the desired volume, the rate of unsatisfactory product yeild becomes high, thus elevating the manufacturing cost of the alloy foil. Furthermore, the handling of such a thin foil is rather difficult. In such cases, it is recommended that the alloy be made in the form of a sheet having slots or a sheet formed into a grating as shown in FIGS. 3B and 3C. This technique reduces the volume without reducing the thickness of the sheet.

Figure 3D:
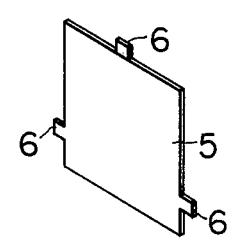

FIG. 3D shows a foil-shaped low-melting point alloy 5 having three fusion detecting lugs 6 on its perphery. When these lugs 6 project outwardly as shown in FIG. 4, the time of complete melting of the alloy 5 can be detected and the heating operation can thus be optimized. Furthermore, the workability of the connection can be improved by such a procedure, and any possibility of the alloy being excessively heat-fused and damaging the battery can be eliminated. The alloy sheets shown in FIGS. 3B and 3C may also be provided with peripheral lugs 6, as indicated by broken lines.

In the embodiment shown in FIG. 5, reference numerals 7 and 8 designate the batteries, reference numeral 9 is a terminal of battery 7, reference numeral 10 is a terminal of battery 8, and reference numeral 11 designates a conductor interconnecting terminals 9 and 10. The conductor 11 may be made of lead, lead alloy, or copper, or any of these materials plated with lead or tin. Reference numerals 12 and 13 designate alloy foils inserted between the conductor 11 and the terminals 9 and 10, respectively. As in the examples above, the alloy has a melting point in a range of from 40° to 180° C., and the interval between the terminals 9 and 10 and the conductor 11 is from 0.02 to 0.5 mm. The alloy foils 12 and 13 may be in the form shown in FIGS. 3A, 3B, 3C, and 3D.

Figure 7:
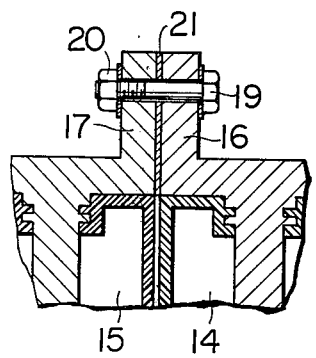
FIG. 7 is a longitudinal sectional view of the connection shown in FIG. 6.
Figure 8:
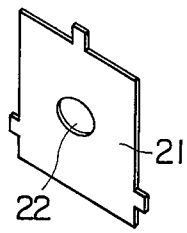
FIG. 8 is a perspective view showing another alloy configuration used in this invention.

In the embodiment of FIGS. 6 and 7, reference numerals 14 and 15 designate the adjacent batteries, reference numerals 16 and 16' designate terminals of the battery 14, and reference numeral 17 designates a terminal of the battery 15. Through the terminals 16, 16' and 17, holes 18 are provided for receiving a bolt 19 secured by a nut 20. A low-melting point alloy foil 21 having a melting point in the range of from 40° to 180° C. is used for connecting the terminals 16 and 17. The alloy foil may have a hole for passing the bolt as shown in FIG. 8. Also, any of the alloy shapes shown in FIGS. 3A, 3B, and 3C provided with a hole for passing the bolt may be used.

The connection of the terminals 16 and 17 in the battery system shown in FIGS. 6 and 7 is carried out as follows. First, an alloy 21 having a shape as shown, for example, in FIG. 8 is inserted between the terminals 16 and 17, and the terminals are then fixed together by the bolt 19 and the nut 20. The low-melting point alloy 21 is then heat-fused. In this example also, the connecting interval between the terminals 16 and 17 is selected in a range of from 0.02 to 0.5 mm. More specifically, the connection is carried out in the following steps:

(1) The connecting surfaces of the terminals are ground by sand paper, brush, or the like until the surfaces become clean and shiny, (2) A thin layer of acid-free paste is applied on the connecting surfaces of the terminals, (3) An alloy foil is inserted between the connecting surfaces, (4) The terminals are clamped together by the bolt and nut under a torque in a range of from 150 to 200 kg-cm, (5) The alloy is heated by an electric iron on the outer surfaces of the terminals until the alloy is completely melted, (6) Immediately after step (5) the terminals are further clamped together under the torque described in step (4) in order to prevent the application of stresses due to vibration or the like to the terminals and the covers of the batteries, and (7) The entire assembly of the terminals is cooled naturally or by water until the molten alloy is completely solidified.

Since the terminals 16 and 17 are held together by the clamping force of the bolt 19 and the nut 20, the connection is not completely lost even when the batteries are used in a vibratory environment and/or when heat generated in the terminals melts the alloy 21.

TEST EXAMPLES

A battery system consisting of twelve storage battery cells each having a rated capacity of 170 Ah (at 10 HR), connected together as shown in FIGS. 6 and 7 using an a eutectic, three element alloy of Bi-Sb-Sn, has undergone life tests under the following conditions. During the test the voltage drop across each connected part of the terminals was measured and the degree of corrosion in that part was observed. Further, dilute sulfuric acid (s.g. 1.280) was applied during the test onto the connected parts.

(1) Charge-discharge tests of the batteries (at room temperature):

28A × 5 h charging and 40A × 3 h discharging. During the test period of approximately one year, no voltage drop increase and no corrosion advance was found. The measured values for the voltage drop (at 40 A discharging) across the terminals of the batteries during the test are shown in Table 2.

Table 2

| Test period (months) | Charge-discharge cycles | Voltage drop mean value (mV) |
| --- | --- | --- |
| 1 | — | 4.7 |
| 2 | — | 4.6 |
| 3 | — | 4.7 |
| 4 | 489 | 4.6 |
| 6 | 561 | 4.6 |
| 8 | 699 | 4.6 |
| 9 | — | 4.6 |
| 10 | 858 | 4.6 |
| 11 | 952 | 4.4 |
| 12 | 1043 | 4.4 |
| 13 | 1105 | 4.5 |

(2) Over-charge test of the batteries (at room temperature): continuous charging at 4 A.

During the test period of approximately one year, no increase in the voltage drop (at 40A discharging) across the terminals of the batteries was found, as shown in Table 3. Furthermore, by visual observation of the connecting parts after they had been disconnected by reheating, it was found that the alloy still preserved its initial brightness, and hence that no corrosion had occured.

Table 3

| Over-charging period (days) | Voltage drop mean value (mV) |
| --- | --- |
| starting time | 4.4 |
| 42 | 4.3 |
| 84 | 4.4 |
| 126 | 4.3 |
| 167 | 4.3 |
| 209 | 4.3 |
| 253 | 4.2 |
| 295 | 4.3 |
| 339 | 4.3 |
| 357 | 4.1 |

In a battery system comprising four storage battery cells of rated capacity 900 Ah (at 10 HR) and having terminals connected together as shown in FIGS. 6 and 7 using a eutectic, three element alloy of Bi-Sb-Sn having a melting point of 95° C., the temperature rise of the connector and the fusing-out of the alloy from the connecting parts at a high discharge rate was tested. The test results are shown in Table 4. In all cases, no deficiencies such as the melting off of the terminals or the fusing out of the alloy were observed. The temperature rise of the connecting parts was found to be low in comparison with that for conventional contact connections, thus posing no problems.

Table 4

| Current (A) | Flowing period (minutes) | Temperature rise (° C) | |
| --- | --- | --- | --- |
| | | Fused connection | Contact connection |
| 1 C | 60 | 13 | 14 |
| 2 C | 20 | 13 | 20 |
| 3 C | 2 | 17 | 25 |
| 5 C | 30 sec. | 27 | 34 |

Figure 9:
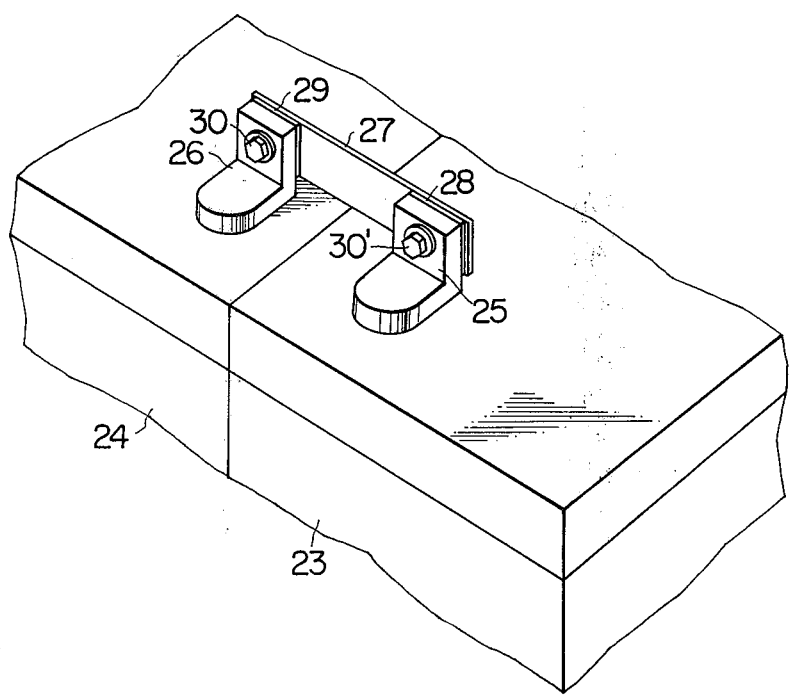
FIG. 9 is a perspective view showing another embodiment of the present invention.

In the embodiment of FIG. 9, reference numerals 23 and 24 designate batteries, reference numeral 25 designates a terminal of the battery 23, reference numeral 26 is a terminal of the battery 24, and reference numeral 27 designates a conductor for connecting the terminals 25 and 26, the conductor consisting of a material similar to that of the conductor 11 shown in FIG. 5. Reference numerals 28 and 29 designate a low-melting point alloy which fuse-connects the terminals 25 and 26 to the conductor 27. Reference numerals 30 and 30' designate bolts. In this case also the interval between the terminals 25 and 26 and the conductor 27 is from 0.02 to 0.5 mm, and the connection is carried out using alloy sheets 28 and 29 having a configuration as shown in FIG. 8 and according to the procedure described above.

What is claimed is:

1. A method of electrically and mechanically interconnecting adjacent electric storage batteries, comprising:

(a) inserting a foil sheet of alloy having a melting point in a range of from 40° C. to 180° C. between the planar surfaces of adjacent terminals of said batteries, said foil sheet having fusion-detecting lugs extending outward from the edges thereof, said planar surfaces forming a gap therebetween in the range of 0.02mm to 0.5mm, and (b) heat-fusing said foil sheet of alloy.

2. A method as defined in claim 1, wherein said adjacent terminals are also held together by a nut and bolt extending therethrough.

3. A method of electrically and mechanically interconnecting adjacent electrical storage batteries, comprising:
(a) inserting a foil sheet of alloy having a slotted configuration, said alloy having a melting point in a range of from 40° C. to 180° C. between the planar surfaces of adjacent terminals of said batteries, said planar surfaces forming a gap therebetween in the range of 0.02mm to 0.5mm, and
(b) heat-fusing said foil sheet of alloy.

4. A method of electrically and mechanically interconnecting adjacent electrical storage batteries, comprising:
(a) inserting a foil sheet of alloy formed into a grating, said alloy having a melting point in a range of from 40° C. to 180° C. between the planar surfaces of adjacent terminals of said batteries, said planar surfaces forming a gap therebetween in the range of 0.02mm to 0.5mm, and
(b) heat-fusing said sheet of alloy.

5. A method of electrically and mechanically interconnecting adjacent electrical storage batteries, comprising:
(a) disposing a conductor having planar ends between the planar surfaces of two storage battery terminals to be interconnected,
(b) inserting a foil sheet of alloy having a melting point in a range from 40° C. to 180° C. between each conductor end and an adjacent battery terminal surface, said foil sheet having fusion-detecting lugs extending outward from the edges thereof, the distance between said conductor ends and an adjacent battery terminal being in the range of 0.02mm to 0.5mm, and
(c) heat-fusing said foil sheets of alloy.

6. A method as defined in claim 5, wherein each of said conductor ends and adjacent battery terminal surfaces is also held together by a nut and bolt extending therethrough.

7. A method of electrically and mechanically interconnecting adjacent electrical storage batteries, comprising:
(a) disposing a conductor having planar ends between the planar surfaces of two storage battery terminals to be interconnected,
(b) inserting a foil sheet of alloy having a slotted configuration, said alloy having a melting point in a range of from 40° C. to 180° C. between each conductor end and an adjacent battery terminal surface, the distance between said conductor ends and an adjacent battery terminal being in the range of 0.02mm to 0.5mm, and
(c) heat-fusing said foil sheets of alloy.

8. A method of electrically and mechanically interconnecting adjacent electrical storage batteries, comprising:
(a) disposing a conductor having planar ends between the planar surfaces of two storage battery terminals to be interconnected,
(b) inserting a foil sheet of alloy formed into a grating, said alloy having a melting point in the range of from 40° C. to 180° C. between each conductor end and an adjacent battery terminal surface, the distance between said conductor ends and an adjacent battery terminal being in the range of 0.02mm to 0.5 mm, and
(c) heat-fusing said foil sheets of alloy.

* * * * *